US005574093A

United States Patent [19]

States, Sr. et al.

[11] Patent Number: 5,574,093
[45] Date of Patent: Nov. 12, 1996

[54] ODOR-REDUCING, NUTRIENT-ENHANCING COMPOSITION

[75] Inventors: John B. States, Sr., Parkesburgh, Pa.; Robert A. Turpin, Jr., Washington, D.C.

[73] Assignee: Pyrocap International Corporation, Springfield, Va.

[21] Appl. No.: 258,079

[22] Filed: Jun. 10, 1994

[51] Int. Cl.$^6$ .................. A61K 47/30; A61K 47/17; A61K 47/18
[52] U.S. Cl. .................. 514/772.1; 424/400; 424/405; 424/76.1
[58] Field of Search .................. 424/400, 26.1; 252/354, 307; 71/900, DIG. 1; 514/940, 772.1

[56] References Cited

U.S. PATENT DOCUMENTS

| 2,005,365 | 1/1935 | Giacinto | 71/5 |
|---|---|---|---|
| 3,286,399 | 11/1963 | Laniece | 47/1.1 |
| 3,345,152 | 10/1967 | Appleman | 71/9 |
| 3,560,190 | 2/1971 | Hughes et al. | 71/5 |
| 3,942,969 | 3/1976 | Carroll et al. | 71/5 |
| 4,370,159 | 1/1983 | Holtz | 71/5 |
| 4,420,319 | 12/1983 | Holtz | 71/5 |
| 4,990,173 | 2/1991 | Katz et al. | 71/5 |
| 5,186,731 | 2/1993 | Parker | 71/6 |

FOREIGN PATENT DOCUMENTS

| 2431998 | 2/1980 | France. |
|---|---|---|
| 9317403 | 2/1994 | Germany. |
| WO90/07374 | 7/1990 | WIPO. |

OTHER PUBLICATIONS

Taniguchi et al., *Chemical Abstract*, 100, 1983, #159440.
Abstract-JP880006280 Database WPI, Section Ch, Week 8935, Derwent Publications Ltd., London.
Abstract-JP870041737 Database WPI, Section Ch, Week 8840, Derwent Publications Ltd., London.
Derikx et al. (1990) *Appl. Environ. Microbiol.* 56 (1):176-180.
Miller et al. (1989) *Australian Journal of Experimental Agriculture* 29:119-124.

*Primary Examiner*—Thurman K. Page
*Attorney, Agent, or Firm*—Birch, Stewart, Kolasch & Birch, LLP

[57] ABSTRACT

Provided is a composition comprising a non-ionic surfactant, an anionic surfactant, a carboxylic acid, a volatile oil, an amine, a nitrogen source, and water. This composition is useful in treating composting material used for cultivating edible fungi such as mushrooms to significantly reduce the malodorous gases normally associated therewith. Mushrooms and other edible fungi grown on such treated compost material exhibit enhanced nutritional qualities, including lower sodium levels and increased protein levels compared to fungi grown on conventionally prepared compost.

23 Claims, No Drawings

ODOR-REDUCING, NUTRIENT-ENHANCING COMPOSITION

BACKGROUND OF THE INVENTION

1. Field of the Invention

The present invention relates to a composition and method for treating composting material used for cultivating edible fungi such as mushrooms to significantly reduce the malodorous gases normally associated therewith, retain water in the fibrous component of the compost composition, and enhance the nutritional quality of the edible fungi without detrimentally affecting crop yield.

2. Description of Related Art

The composting of animal waste to create a suitable organic substrate in which to cultivate mycelia of edible fungi has long been the accepted practice. The process, on which there are several variations, is generally one of aerobic biodegradation, i.e., fermentation, and comprises the use of horse manure and poultry manure; straw or other carbohydrate-rich substances essentially containing cellulose, hemicellulose, and lignin; nitrogen-rich nutrients, e.g., cotton seed, sunflower seed, seed meals, brewer's grains, and urea; and inorganic conditioners, e.g., lime and gypsum. Broadly speaking, composting involves the fermentation of straw and animal manure over a period of approximately one month, with periodic turning and wetting to assure proper biological activity.

The straw or cellulosic material is wet with water prior to mixing to provide moisture to the fermenting microorganisms during the fermentation process. Such wetting usually requires copious amounts of water due to the waxy nature of the straw's surface. The excess water runs off into a catch basin, carrying with it residual manure solubles and suspended organic matter, causing an accumulation of odor-causing agents in the catch basin.

Mushroom cultivation has been an activity carried out in relatively remote rural areas. However, as these formerly remote locations have become more densely populated because of urbanization and because increased commercial demand for the produce has caused growers to greatly enlarge their processing and growing facilities, government entities and concerned neighbors have brought attention to the odors and runoff associated with the traditional methods commonly practiced in this agribusiness.

The odors are largely caused by volatile sulfur compounds released by the microbial action during fermentation. These include hydrogen sulfide, methyl mercaptan, dimethyl sulfide, carbonyl sulfide, carbon disulfide, and dimethyl trisulfide. Ammonia, and traces of acetone, butanone, 3-methylbutanone, and 2-pentanone, have also been identified in the gas emissions from compost stacks (Derikx et al. (1990) "Odorous Sulfur Compounds Emitted During Production of Compost Used As A Substrate In Mushroom Cultivation", *Applied and Environmental Microbiology* 56:176–180). It is feared that the water runoff may leach into the ground water and cause pollution of drinking water for livestock and humans alike.

Odor control in the field of animal waste composting for mushroom cultivation has been addressed from several points of view. Miller and Macauley (1989) "Substrate Usage and Odours In Mushroom Composting", *Australian Journal of Experimental Agriculture*, 29:119–124, report that the odor problems are directly associated with the compost formulations, and that by adjusting the activator (nitrogen-rich nutrient) constituent in relation to the total dry weight, one may achieve reduced odor emissions. U.S. Pat. No. 3,345,152 teaches a method of deodorizing manure and human excreta by distilling the waste material at temperatures of 400° F. and reintroducing the gaseous effluent—water removed—into the waste stream to be "bonded" thereto. The resulting odor is that of a tobacco- or barbeque-like smell. Whereas this method changes the odor to one less offensive, the heat of distillation would destroy the microorganisms required for aerobic fermentation.

Methods of mushroom growth activation have been reported in the patent literature and in scholarly journals. For example, U.S. Pat. No. 4,420,319 teaches methods of effecting greater yield in shortened periods by employing a multistage process of the introduction of a manufactured mushroom spawn activator in combination with a delayed-release nutrient particle. U.S. Pat. No. 4,990,173 teaches a nutrient supplement for enhancing the growth of mushrooms comprising a protein-rich material coated with a hydrophilic carbohydrate. U.S. Pat. No. 3,560,190 teaches the use of dry, friable, granular nutrient supplement comprising a blend of cottonseed meal, cottonseed oil, and a hardwood sawdust as an absorbent. The novelty of that teaching is evidenced by the increase in volume of the mushroom harvest. U.S. Pat. No. 4,370,159 further teaches an improved nutrient growth-stimulating additive for mushroom compost which comprises the mixing of materials including soy and/or cottonseed oil with soy protein concentrate, calcium caseinate, sodium acetate, and lecithin. Successful growth stimulation was achieved. U.S. Pat. No. 5,186,731 claims a method of cultivating mushrooms comprising mixing mushroom spawn with compost and an amount of supplement to enhance the yield of fruiting bodies, said supplement being a calcium and/or amine salt of an aliphatic, alicyclic or heterocyclic carboxylic acid. It further teaches that said acids may be mono- or dibasic, saturated or unsaturated, and have up to 20 carbon atoms. The amine salts of that invention comprise ethylamine, diethylamine, triethylamine, triethanolamine or ethylenediamine.

SUMMARY OF THE INVENTION

The compositions and methods of the present invention have been devised to eliminate the aforementioned problems associated with current cultivation methods, and to facilitate the production of mushrooms and other edible fungi having enhanced nutritional value. The present invention provides a cost effective method of composting animal waste matter with cellulose-containing material in a manner so as to eliminate the generation of malodorants and reduce significantly the water runoff problem associated with current commercial cultivation methods. The present invention also provides a method for cultivating mushrooms and other edible fungi having improved nutritional characteristics, i.e., greater protein content and lower sodium content.

Accordingly, it is an object of the present invention to provide a composition, comprising a non-ionic surfactant, an anionic surfactant, a carboxylic acid, a volatile oil, an amine, a nitrogen source, and water. The nitrogen source can be urea, nitrates such as $NaNO_3$, $Ca(NO_3)_2$, $KNO_3$, etc.

Another object of the present invention is to provide a method of composting animal manure and cellulosic materials, comprising treating said animal manure and cellulosic materials with a composition comprising a surfactant, a carboxylic acid, a volatile oil, an amine, a nitrogen source such as urea, and water during formation of compost stacks.

Yet another object of the present invention is to provide a method of cultivating mushrooms or other edible fungi, comprising growing said mushrooms or other edible fungi on a compost of animal manure and cellulosic materials treated with a composition comprising a surfactant, a carboxylic acid, a volatile oil, an amine, a nitrogen source such as urea, and water during formation of said compost.

Further scope of the applicability of the present invention will become apparent from the detailed description provided below. It should be understood, however, that the detailed description and following specific examples, while indicating preferred embodiments of the present invention, are given by way of illustration only since various changes and modifications within the spirit and scope of the invention will become apparent to those skilled in the art from this detailed description.

DETAILED DESCRIPTION OF THE INVENTION

The following detailed description of the invention is provided to aid those skilled in the art in practicing the present invention. Even so, the following detailed description of the invention should not be construed to unduly limit the present invention, as modifications and variations in the embodiments herein discussed my be made by those of ordinary skill in the art without departing from the spirit or scope of the present inventive discovery.

The contents of each of the references cited herein are herein incorporated by reference in their entirety.

To accomplish the foregoing objectives, material comprising, for example, horse manure, poultry manure, an activator, and a stabilizer such as gypsum are mixed into stacks, and an aqueous composition comprising at least one non-ionic surfactant, at least one anionic surfactant, at least one carboxylic acid, at least one volatile oil, at least one amine, and a nitrogen source such as urea are added thereto to produce a compost. The activator is a nutrient enhancer, such as a brewer's grain, which contributes nitrogen and protein to the composting material. The stacks are aerated by turning the mixture on the second, third, sixth and eighth days, wetting the compost mix on the first turn with water, on the second turn with water or said aqueous composition, and on subsequent turns with water. Trays are filled on the eighth day, and the compost is pasteurized for seven days. The prepared compost is spawned by adding a suitable nutrient supplement at 4% of dry weight, and the trays are placed in a controlled environment for two weeks to allow the spawn to colonize the compost. The trays are cased with peatmoss and lime to a depth of approximately 1.25 inches, and placed in a growing area for fruit development.

The aqueous additive composition used initially, and optionally on the second turn, comprises an emulsion of the following components, which is completely miscible in water:

about 0.01% to about 5% by weight of a non-ionic surfactant;

about 0.2% to about 6% by weight of an anionic surfactant;

about 0.05% to about 3% by weight of a carboxylic acid, preferably an unsaturated fatty acid;

about 0.05% to about 3% by weight of a volatile oil, preferably having a functional group containing oxygen, e.g., an epoxy, peroxy, hydroxyl, carboxyl, carbamyl, or carbonyl group;

about 0.1% to about 5% by weight of an amine selected from the group consisting of a mono-, di-, and trialkanolamine;

about 0.15% to about 2% by weight of a nitrogen source such as urea, $NaNO_3$, $Ca(NO_3)_2$, $KNO_3$, etc.; and water in an amount to make the balance of 100%.

In practice, the emulsion is premixed as a concentrate and diluted prior to application. Thus, the concentrations indicated above represent, at the low end, the final concentrations as actually applied to the material to be composted; at the high end, these concentrations represent concentrations prior to dilution and application. Concentrations between these endpoints can also be employed in practice.

The emulsion is applied to the compost at a rate of about 6 to about 10 liquid ounces per pound of compost, more preferably at a rate of about 8 liquid ounces per pound of compost.

The additive composition of the present invention is formulated having as its base a surfactant blend that is compatible with the biological process of fermentation of animal waste and cellulosic materials.

The surfactants are selected from those which are biodegradable, emulsifiers, as well as wetting agents.

Non-Ionic Surfactants

Non-ionic surfactants useful in the present invention include, but are not limited to, amides and esters of aliphatic, alicyclic, and aromatic acids, polyglycol ethers, and alkylphenol esters.

Preferred non-ionic surfactants useful in the present invention are the amides of fatty acids and the polyglycol ethers. Most preferred are cocamide, lauramide, oleamide and stearamide of mono- and diethanol amine.

Anionic Surfactants

Anionic surfactants useful in the present invention can be selected from the group consisting of ammonium, amine, and alkali salts of aliphatic, alicyclic, aromatic, alkylaryl, and alkyl ether sulfonates and sulfates.

The preferred anionic surfactant used in the present invention is at least one member selected from the group consisting of an alkylbenzene sulfonate, an alkyl sulfate, and an alkyl ether sulfate. Of particular utility are sodium, ammonium, monoethanol amine, diethanol amine, and triethanol amine salts of dodecyl benzene sulfonic acid, lauryl sulfuric acid, and lauryl ether sulfuric acid.

Carboxylic Acids

Carboxylic acids useful in the present invention are straight or branched chain, saturated or unsaturated carboxylic acids containing from two to twenty carbon atoms. Such acids can be mono-, di-, or tribasic, and can be used in combination with other similar carboxylic acids. Examples of suitable carboxylic acids include acetic, propionic, butyric, valeric, caproic, caprylic, nonylic, palmitic, stearic, arachidic, glycolic, suberic, citric, oleic, linoleic, and linolenic acids.

Of particular utility in the practice of the present invention is the use of vegetable oils such as corn, olive, cottonseed, and linseed oil. These oils, singularly or in combination with each other and/or with the carboxylic acids noted above, e.g., citric acid, provide the desired results of odor suppression and nutrition enhancement.

Volatile Oils

The volatile oil component of the composition of the present invention is at least one volatile oil having a functional group containing oxygen, e.g., an epoxy, peroxy, hydroxyl, carboxyl, carbamyl, or carbonyl group.

Useful volatile oils include, but are not limited to, the oils of eucalyptus, peppermint, spearmint, and others containing as a major component a $C_{10}$ terpene containing a functional group containing oxygen as described above. Such other volatile oils include, for example, terpin, terpineol, boreol, citronellal, citronellol, geraniol, linalool, menthol, 1-menthone, nerol, rhodinal, and rhodinol.

Other oils useful in the present invention are terpenes having olefinic bonds, e.g., limonene, pinene, and terpinene.

Amines

Amines useful in the present invention include at least one primary, secondary, or tertiary alkanol amine. Monoethanol amine, diethanol amine, and triethanol amine are preferred.

Nitrogen Sources

Nitrogen sources useful in the present invention include, for example, at least one member selected from the group consisting of urea, $NaNO_3$, $Ca(NO_3)_2$, $KNO_3$, etc.

Compost

The composition of the compost is not limited in any way, and can vary according to the practice of the composter or grower.

EXAMPLE 1

For purposes of illustration, a formulation was chosen which represents a typical compost mix. The practice of the present invention is not limited to this compost, but is useful on any compost mix for the cultivation of mushrooms or other edible fungi wherein animal manure and straw are the base components.

The compost comprised a mixture of wheat straw, horse manure, poultry manure, brewer's grain, and gypsum. The formulation of said compost is shown in Table 1.

TABLE 1

Formulation of Wheat Straw Bedded Horse Manure Compost

|  | Wet Wgt | % $H_2O$ | Dry Wgt | % N | Total N |
|---|---|---|---|---|---|
| Horse manure | 350 | 23 | 269.5 | 1.0 | 2.695 |
| Poultry manure | 40 | 9 | 36.0 | 5.2 | 1.872 |
| Brewers' grain | 10 | 6 | 9.4 | 5.0 | 0.470 |
| Gypsum | 12 | 0 | 12.0 | — | — |
| Totals |  |  | 326.9 |  | 5.037 |

% N = 5.037/326.9 = 1.54 wherein wet weight and dry weight are in pounds, and wherein the total nitrogen is also in pounds, as derived from the percentage of dry weight. For example, in this case, where 36 pounds of poultry manure were employed, 36 pounds×0.052=1.872 pounds.

EXAMPLE 2

Manure compost stacks of Example 1, weighing approximately 412 pounds, were wetted at formation with either water (control) or the aqueous emulsions shown in Table 2. The emulsions were applied to the compost at at a rate of about 8 liquid ounces per pound of compost.

TABLE 2

Composition of Compost Odor-Suppressing Emulsions

|  | #1 | #2 | #3 |
|---|---|---|---|
| Sodium docecyl benzene sulfonate | 0.16% by wt. | 0.1% by wt. | 0.35% by wt. |
| Sodium lauryl ether sulfate | 0.21 | 0.13 | 0.40 |
| DEA cocamide | 0.02 | 0.012 | 0.05 |
| Diethanol amine | 0.025 | 0.015 | 0.05 |

TABLE 2-continued

Composition of Compost Odor-Suppressing Emulsions

|  | #1 | #2 | #3 |
|---|---|---|---|
| Urea | 0.015 | 0.01 | 1.0 |
| Citric acid | — | 0.15 | 0.25 |
| Corn oil | 0.05 | — | — |
| Oleic acid | — | 0.05 | 0.1 |
| Oil of eucalyptus | 0.05 | 0.03 | 0.075 |
| a-Terpineol | — | 0.045 | 0.075 |
| (+)-Limonene | — | 0.02 | 0.05 |

The control stack was prepared in every way similar to the experimental stacks, with the exception that water was used in the initial wetting and at each successive turning.

The results for all stacks in terms of odor, temperature, organic content, color, and texture followed an expected course, without significant variance from the standard commercial product.

The dry ingredients accepted 45 to 47 gallons of water or compositions #1, #2, and #3, respectively. The stacks were allowed to stand for forty-eight hours while internal heat developed, rising to a temperature of 163° F. The compost was turned with wetting on days 2, 3, 6, and 8. Temperature were monitored during composting. The peak internal temperature achieved prior to the second turning was 156.5° F. Subsequent turnings were made on the sixth and eighth days of the process, with the eighth day's material being filled into trays and placed into a controlled environment to be pasteurized.

Seven days later, the trays were spawned using a commercial spawn, Lambert 932, and the compost was supplemented with Campbell's Fresh, Inc.'s "S-41" at 4% of the compost dry weight. Once prepared, the trays were placed into another controlled environment for two weeks at a temperature of 78° F. with daily over-rides of 83° F. to allow colonization of the spawn (spawn run). After spawn run, the compost was cased with a mixture of peatmoss and ground limestone to a depth of 1.25 inches, and the trays placed in a growing room using a completely randomized design.

The experimental design consisted of four treatments, each consisting of six replicate trays. Harvesting began on the nineteenth day and continued daily for six weeks. Mushrooms were harvested daily, and the mushrooms from each tray were counted and weighed. These yield data were accumulated into six seven day breaks (flushes), and the harvests for breaks 1–3 and 1–6 were summarized for statistical analysis.

Results

Compost and Composting

Chemical analyses for the four compost treatments are summarized in Tables 3 and 4, for filling and spawning, respectively.

TABLE 3

Chemical Analysis of Compost at Filling

| FILL | pH | % $NH_3$ | % N | % $H_2O$ | % Ash | % OM |
|---|---|---|---|---|---|---|
| Control | 8.51 | 0.04 | 2.26 | 76.1 | 27.94 | 72.06 |
| #1 | 839 | 0.04 | 1.91 | 78.7 | 18.56 | 81.44 |
| #2 | 8.66 | 0.02 | 2.20 | 76.4 | 24.35 | 75.65 |
| #3 | 8.49 | 0.05 | 2.07 | 79.6 | 22.61 | 77.39 |

TABLE 4

Chemical Analysis of Compost at Spawning

| SPAWN | pH | % $NH_3$ | % N | % $H_2O$ | % Ash | % OM |
|---|---|---|---|---|---|---|
| Control | 7.69 | 0.03 | 2.34 | 73.2 | 29.3 | 70.7 |
| #1 | 7.52 | 0.03 | 1.94 | 73.4 | 25.1 | 74.9 |
| #2 | 7.68 | 0.01 | 2.22 | 72.5 | 29.4 | 70.6 |
| #3 | 7.77 | 0.06 | 2.03 | 75.1 | 26.8 | 73.2 |

The amount of organic matter remained exceptionally high at spawning in the compost treated with composition #1, while the other values for the compost were within a normal range.

Odors

No foul odors were detected during any of the turnings in the compost treated with composition #1. Such compost smelled like hot straw at filling, with no ammonia smell. At filling, workers commented that the composts treated with compositions #2 and #3 had a more agreeable odor than compost made using plain water.

Compost Wetting

Compositions #1, #2, and #3 facilitated wetting of the dry compost ingredients, and the compost on subsequent turnings.

Dry straw is almost impossible to wet, with water beading and rolling off the straw. With the compositions of the present invention, water appeared to flatten and adhere to the straw much better than occurred in the water control. The improved water adherence was also observed on the first turning.

Composting Temperatures

Compositions #2 and #3 caused a slight suppression of Phase I composting temperatures, which was not observed with composition #1. During Phase II composting, all three compositions caused the compost to cook at a slightly higher temperature than the water control. Compost treated with composition #1 cooked at a slightly higher temperature than that treated with compositions #2 and #3.

Spawning, Spawn Run, and Casing

A slight hint of ammonia in the compost on spawning day was controlled by adding gypsum to the compost before spawning. This is a routine procedure widely practiced in the mushroom industry.

The four composts, i.e., that treated with water, and those treated with compositions #1, #2, and #3, were of good quality, having uniform color, moisture, and good texture. No adverse effects of the present compositions on the composts were observed, and the thoroughness of the spawn run two weeks later attested to the compost quality.

Mushroom Yield and Size

Mushrooms began picking on time, and the rhythm of the breaks was steady. None of the treatments had any negative effect on these parameters.

None of the treatments affected the average size of the mushrooms, i.e., mushrooms per pound. Yields were generous in all treatments, and the treatments did not affect either the yield or the size of the mushroom crop as shown in Table 5.

TABLE 5

Mushroom Yield and Size

| | Control | #1 | #2 | #3 |
|---|---|---|---|---|
| Breaks 1 to 3 | 3.14 | 2.97 | 3.04 | 2.94 |
| Lbs. $ft.^{-2}$ | | | | |
| Number $Lb.^{-1}$ | 53 | 55 | 58 | 50 |
| Breaks 1 to 6 | 3.76 | 3.75 | 3.43 | 3.53 |
| Lbs. $ft.^{-2}$ | | | | |
| Number $Lb.^{-1}$ | 48 | 49 | 53 | 46 |

Nutritional Value of Mushrooms

In order to determine if the compost treatments affected the nutritional value of the harvested mushrooms, mushrooms were collected from replicate trays at the time of the first break and analyzed. A composite sample was prepared by combining the samples from each replicate tray, and one composite sample, representing each compost treatment, was analyzed for a variety of nutritional components. The results are shown in Table 6, where the data are expressed in mg/100 grams fresh weight.

TABLE 6

Nutritional Characteristics of Mushrooms Harvested From Compost Treated With Odor-Suppressing Emulsions

| | Control | #1 | #2 | #3 |
|---|---|---|---|---|
| Moisture | 92.5 | 92.2 | 92.1 | 91.9 |
| Ash | 0.51 | 0.55 | 0.60 | 0.60 |
| Total Carbohydrates | 4.7 | 4.6 | 4.6 | 4.8 |
| Est. caloric value | 29.5 | 29.9 | 30.7 | 31.2 |
| Calcium | 9.5 | 10.1 | 9.6 | 7.6 |
| Iron | 0.2 | 0.2 | 0.2 | 0.3 |
| Sodium | 10.7 | 4.2 | 3.5 | 3.1 |
| Dietary fiber | 2.3 | 2.2 | 2.1 | 2.3 |
| Protein | 2.0 | 2.5 | 2.5 | 2.5 |
| Fat (acid extract) | 0.3 | 0.2 | 0.3 | 0.2 |
| Fructose | 0.1 | 0.2 | 0.2 | 0.2 |
| Dextrose | 2.0 | 1.9 | 1.9 | 1.7 |

Mushroom sodium content was reduced between 60% and 71% by the use of the present compositions. Protein content was increased 25%.

Summary of Results

1. Wetting of the compost was enhanced, both at the initiation of composting, and during subsequent steps of composting. No beading of water upon wetting of the straw material occurred. Instead, the water soaked into the substrate, resulting in more complete wetting, with less water run-off;

2. Foul odors, including ammonia odors, normally detected during turnings, were eliminated, leaving only the smell of "hot straw." Composition #1 was particularly effective in this respect;

3. Composting temperatures ran slightly higher than those in the water-only control stack;

4. Chemical analysis revealed that the compost treated with composition #1 was of exceptionally good quality, with uniform color and moisture, good texture, and increased organic content compared to the control;

5. Mushroom yield was generous, and compared well with or exceeded conversions measured at commercial farms. There were no adverse effects on crop yield or mushroom size;

6. Mushrooms grown on compost produced via the present novel treatment of the cultivation substrate contained 60% to 71% less sodium than mushrooms produced by conventional methods, and 25% more protein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An aqueous composition, comprising an effective amount of a non-ionic surfactant, an anionic surfactant, a carboxylic acid, a volatile oil, an amine, a nitrogen source, and water, sufficient for reducing foul odors during the formation of compost.

2. The composition of claim 1, wherein said non-ionic surfactant is present in an amount of from about 0.01% to about 5% by weight of the total composition, said anionic surfactant is present in an amount of from about 0.2% to about 6% by weight of the total composition, said carboxylic acid is present in an amount of from about 0.05% to about 3% by weight of the total composition, said volatile oil is present in an amount of from about 0.05% to about 3% by weight of the total composition, said amine is present in an amount of from about 0.1% to about 5% of the total composition, said nitrogen source is present in an amount of from about 0.15% to about 2% by weight of the total composition, and said water is present in an amount to make the balance of 100% by weight of the total composition.

3. The composition of claim 1, wherein said carboxylic acid is an unsaturated fatty acid.

4. The composition of claim 1, wherein said volatile oil contains a functional group containing oxygen.

5. The composition of claim 4, wherein said functional group containing oxygen is a member selected from the group consisting of an epoxy group, a peroxy group, a hydroxyl group, a carboxyl group, a carbamyl group, and a carbonyl group.

6. The composition of claim 1, wherein said amine is at least one member selected from the group consisting of a mono-alkanolamine, a di-alkanolamine, and a tri-alkanolamine.

7. The composition of claim 1, wherein said nitrogen source is at least one member selected from the group consisting of urea, $NaNO_3$, $Ca(NO_3)_2$, and $KNO_3$.

8. The composition of claim 1, wherein said non-ionic surfactant is at least one member selected from the group consisting of an amide of an aliphatic acid, an amide of an alicyclic acid, an amide of an aromatic acid, an amide of a fatty acid, an ester of an aliphatic acid, an ester of an alicyclic acid, and ester of an aromatic acid, a polyglycol ether, and an alkylphenol ester.

9. The composition of claim 8, wherein said amide of a fatty acid is at least one member selected from the group consisting of cocamide, coconut fatty acid diethanoi amide, lauramide, oleamide, stearamide of monoethanolamine, and stearamide of diethanolamine.

10. The composition of claim 1, wherein said anionic surfactant is at least one member selected from the group consisting of an ammonium salt of an aliphatic, alicyclic, aromatic, alkylaryl, or alkylether sulfonate; an ammonium salt of an aliphatic, alicyclic, aromatic, alkylaryl, or alkylether sulfate; an amine salt of an aliphatic, alicyclic, aromatic, alkylaryl, or alkylether sulfonate; an amine salt of an aliphatic, alicyclic, aromatic, alkylaryl, or alkylether sulfate; an alkali salt of an aliphatic, alicyclic, aromatic, alkylaryl, or alkylether sulfonate; and an alkali salt of an aliphatic, alicyclic, aromatic, alkylaryl, or alkylether sulfate.

11. The composition of claim 1, wherein said anionic surfactant is at least one member selected from the group consisting of an alkylbenzene sulfonate, an alkyl sulfate, and an alkyl ether sulfate.

12. The composition of claim 1, wherein said anionic surfactant is at least one member selected from the group consisting of sodium dodecyl benzene sulfonic acid, sodium tridecyl ether sulfate, sodium lauryl sulfuric acid, sodium lauryl ether sulfuric acid, ammonium dodecyl benzene sulfonic acid, ammonium lauryl sulfuric acid, ammonium lauryl ether sulfuric acid, monoethanolamine dodecyl benzene sulfonic acid, monoethanolamine lauryl sulfuric acid, monoethanolamine lauryl ether sulfuric acid, diethanolamine dodecyl benzene sulfonic acid, diethanolamine lauryl sulfuric acid, diethanolamine lauryl ether sulfuric acid, triethanolamine dodecyl benzene sulfonic acid, triethanolamine lauryl sulfuric acid, and triethanolamine lauryl ether sulfuric acid.

13. The composition of claim 1, wherein said carboxylic acid is a straight- or branched chain, saturated or unsaturated carboxylic acid, containing from two to twenty carbon atoms.

14. The composition of claim 13, wherein said carboxylic acid is monobasic, dibasic, or tribasic.

15. The composition of claim 1, wherein said carboxylic acid is at least one member selected from the group consisting of acetic acid, propionic acid, butyric acid, valeric acid, caproic acid, caprylic acid, nonylic acid, palmitic acid, stearic acid, arachidic acid, glycolic acid, suberic acid, citric acid, oleic acid, linoleic acid, and linolenic acid.

16. The composition of claim 1, wherein said carboxylic acid is in the form of a vegetable oil.

17. The composition of claim 16, wherein said vegetable oil is at least one member selected from the group consisting of corn oil, olive oil, cottonseed oil, and linseed oil.

18. The composition of claim 1, wherein said volatile oil is at least one member selected from the group consisting of oil of eucalyptus, peppermint oil, spearmint oil, terpin, terpineol, boreol, citronellal, citronellol, geraniol, linalool, menthol, 1-menthone, nerol, rhodinal, rhodinol, a volatile oil containing as a major component a $C_{10}$ terpene containing a functional group containing oxygen, and a terpene having olefinic bonds.

19. The composition of claim 18, whereine said terpene having olefinic bonds is at least one member selected from the group consisting of limonene, pinene, and terpinene.

20. The composition of claim 1, wherein said amine is at least one member selected from the group consisting of a primary alkanolamine, a secondary alkanolamine, and a tertiary alkanolamine.

21. The composition of claim 20, wherein said amine is at least one member selected from the group consisting of monoethanol amine, diethanoi amine, and triethanol amine.

22. The composition of claim 1, wherein said nitrogen source is urea.

23. An aqueous composition, comprising 0.16% by weight sodium dodecyl benzene sulfonate; 0.21% by weight lauryl ether sulfate; 0.02% by weight DEA cocamide; 0.05% by weight corn oil; 0.05% by weight oil of eucalyptus; 0.025% by weight diethanoi amine; 0.015% by weight urea; and the balance by weight of water.

* * * * *